United States Patent [19]

Blair et al.

[11] 4,139,677

[45] Feb. 13, 1979

[54] METHOD OF MOLDING GLASS ELEMENTS AND ELEMENT MADE

[75] Inventors: Gerald E. Blair, Pittsford; John H. Shafer, Penfield; John J. Meyers, Rochester; Frank T. J. Smith, Fairport, all of N.Y.

[73] Assignee: Eastman Kodak Company, Rochester, N.Y.

[21] Appl. No.: 762,898

[22] Filed: Jan. 26, 1977

Related U.S. Application Data

[63] Continuation of Ser. No. 609,328, Sep. 2, 1975, abandoned.

[51] Int. Cl.² .................................................. C03B 11/08
[52] U.S. Cl. .................................... 428/409; 65/32; 65/37; 65/66; 65/374 R
[58] Field of Search ............... 65/32, 37, 66, 68, 69, 65/374 R; 428/409; 249/114; 65/24, 26

[56] References Cited

U.S. PATENT DOCUMENTS

| 3,244,497 | 4/1966 | Copeland | 65/26 X |
| 3,286,312 | 11/1966 | Davis et al. | 249/114 X |
| 3,833,347 | 9/1974 | Angle et al. | 65/374 R |

*Primary Examiner*—Arthur D. Kellogg
*Attorney, Agent, or Firm*—J. Morrow

[57] ABSTRACT

A method of molding glass elements requiring no further preparatory operations such as grinding or polishing before use wherein a portion of glass is heat-softened and subjected to pressure in a mold having molding surfaces formed of silicon carbide (SiC) or silicon nitride ($Si_3N_4$).

24 Claims, 4 Drawing Figures

FIG. 1

METHOD OF MOLDING GLASS ELEMENTS AND ELEMENT MADE

This is a continuation, of application Ser. No. 609,328, filed Sept. 2, 1975 now abandoned.

CROSS REFERENCE TO RELATED APPLICATIONS

Reference is made to commonly assigned copending U.S. application Ser. No. 762,897, filed on even date herewith for a Method of Molding Glass Elements in the name of G. E. Blair, that application being a continuation of U.S. application Ser. No. 609,329, filed Sept. 2, 1975 now abandoned.

BACKGROUND OF THE INVENTION

1. Field of the Invention

This invention relates generally to the manufacture of glass optical elements, and, in particular, to methods of molding glass optical elements such as lenses and prisms.

2. Description of the Prior Art

In manufacturing glass elements, it is generally necessary that the glass element meet certain criteria in order to be suitable for its intended use. This is particularly true for optical elements. For instance, in selecting a lens intended for use in photographic apparatus where good image-forming qualities are necessary, the nature of the lens surface must be considered. The characteristics of a surface which are important in this regard are known in the art as surface quality and surface accuracy. Surface quality is related to the occurrence of defects such as scratches, digs, pits, voids, "orange peel", etc. on the surface of an element. An element is said to be of "high surface quality" if the number of such defects is sufficiently low so that the element is suitable for its intended use. For instance, in the case of a lens to be used in photographic apparatus, the number of such defects must be low enough so that image forming qualities of the lens are not impaired. It is understood that the number of such defects which can be tolerated depends on the particular element being considered and its intended use.

Surface accuracy, which is usually specified in terms of the wave length of light of a specific color, refers to the dimensional characteristics of the surface, i.e. the value and uniformity of the radius of curvature of the surface. The surface accuracy is generally determined by an interferometric comparison of a surface of the element with a test plate gauge, by counting the number of Newton's rings, and by examining the regularity of the rings. The surface accuracy of an element is often referred to as its fit. The fit of an element is expressed in terms of its power (the number of Newton's rings which are counted) and its irregularity (the difference between the number of rings when counted in perpendicular directions across the fringe pattern). The lower the values of the power and irregularity, the better the lens, or, in other words, the higher its accuracy. Therefore, "high surface accuracy", or "precise fit" refers to a surface which has dimensional characteristics that are extremely close to their design value and are very uniform. For instance, the surface accuracy of a lens to be used in a photographic apparatus is frequently considered high when it has a power of less than six rings and an irregularity of less than three rings.

The manufacture of glass optical elements has conventionally required a series of complex and expensive steps, including molding, grinding, and polishing operations. For instance, in the conventional manufacture of a glass lens, a rough molded glass lens blank is first made by heating a chunk of glass to a softened state and pressing the glass to the desired shape in a metal mold. In some cases, the glass may adhere to the molding surfaces. To prevent this adherence, the mold temperature may be reduced below the glass temperature during pressing. However, this technique may produce an irregular surface called "chill wrinkle", when the hotter glass comes into contact with the cooler mold surface. Another technique is to heat the chunk of glass on a hearth plate prior to molding. A thin layer of a parting agent may be used to prevent the glass from sticking to the hearth plate. The parting agent may become embedded in the rough molded glass surface. When formed with these techniques, a rough molded lens blank does not possess the high surface quality and high surface accuracy necessary for an image-forming lens. Hence, it is necessary to mold a lens blank which is larger than the intended lens element to allow for the removal of material during the subsequent grinding and polishing operations needed to render the lens suitable for use.

Spherical lens surfaces can be generated by rotating the lens blank in a vacuum chuck and grinding the lens blank with a rotating annular tool whose axis is at an angle to the chuck axis. The tool has an abrasive surface including diamond chips. The geometry of this arrangement causes a sphere to be generated wherein the radius is determined by the angle between the axes of the chuck and of the rotating generating tool, and by the effective diameter of the tool. The thickness is governed by the distance the work is advanced into the tool. The surface of the lens blank may be refined further by grinding operations performed with loose abrasive in a water slurry and cast iron grinding tools.

After the grinding operations has been concluded, the lens element can be polished by a process similar to the grinding process. The polishing tool is lined with a layer of pitch and the polishing compound is a slurry of water and rouge (iron-oxide) or cerium oxide. Polishing is continued until substantially all of the grinding pits and scratches are removed from the surface of the lens. Then, the lens shape is checked and corrections are made to assure the proper shaping of the lens.

Following the polishing operation, the lens is centered by grinding the rim of the lens, so that its mechanical axis (defined by the edge of the lens) coincides with the optical axis (the line between the centers of curvature of the two lens surfaces). Lens centering can be done either by known visual methods which are very accurate or by more economical mechanical methods.

It is considerably more complicated to produce non-spherical lens surfaces. The manufacture of precise aspheric lens surfaces requires a combination of exacting measurement and skilled hand correction. One method involves the difficult operation of working a lens blank between centers on a lathe. Aspheric lenses can be made in small production quantities, where high precision is not required, by means of a cam guided grinding rig for generating the lens surface. Thereafter, the troublesome operations of grinding and polishing the aspheric lens surface are performed, the problem being that these operations can easily destroy the basic shape of the lens. Where precise aspheric surfaces are required, it is necessary to make grinding adjustments manually with the concomitant requirements of great delicacy and finesse, the shortcomings of which are apparent.

The expense of existing methods for fabricating glass lenses has led to the limited use of plastic lenses. Plastic has several advantages as a lens material, namely, it is light, shatterproof, and moldable. However, presently available plastics which are practical for use as lens materials such as polystyrene, polycyclohexyl methacrylate, and polymethyl methacrylate, are relatively soft and scratch easily. Moreover, the latter plastic tends to be frequently hazy and sometimes yellowish. Also, plastics usually soften within the range of 60° to 80° C. and their indices of refraction may change in time. Most plastics absorb water and are subject to dimensional change, the latter charactertistic being due to their tendency to cold flow under pressure and to their high thermal expansion coefficient which is almost ten times that of glass. In addition, the high thermal expansion of the plastics causes changes in the indices of refraction of the plastics to an extent ten times that of glass, thus severely hampering the optical performance of the lens.

Thus, glass is clearly a more desirable lens material than plastic, but plastic lenses are considerably easier and cheaper to manufacture than glass lenses because they can be mass produced by molding. However, conventional molding methods have not been found suitable for directly making glass lenses that do not require further preparatory operations. One reason for this is the tendency of heated glass to adhere to some materials and for the glass to remain adhered to the materials after cooling. Thus, one of the prerequisites for producing a suitable lens directly from a mold is that the glass being molded does not permanently adhere to the molding surface. Non-adherence alone, however, is not sufficient, because it has been found that glass will replicate the surface of materials to which the glass does not ahere. For example, glass molded in metal dies has been found to reproduce the grain structure of the metal molding surfaces on the surface of the glass, and such lenses are unsuitable for optical uses without further operations to improve the quality and accuracy of their surfaces. U.S. Patent 3,244,497 discloses the use of extremely thin coatings of refractory materials (approximately half wavelength) to protect a mirror finish metal molding surface and act as a parting agent in a glass molding structure for producing ophthalmic lenses. But, even though surface characteristic tolerances for most ophthalmic lenses are not as stringent as for many optical elements (e.g. 100 ring power may be acceptable), it is nevertheless still necessary to perform additional polishing operations on lens blanks molded in the molding structure disclosed in U.S. Pat. No. 3,244,497 in order to produce even an ophthalmic lens suitable for use. Thus, although it is apparent that in order to directly mold glass lenses the mold surfaces must be of high quality and high accuracy and must not be adhered to by glass, it is equally clear that meeting these requirements does not guarantee that the lens produced will not require further preparatory operations, such as polishing, in order to be rendered suitable for use. The failure of known molding methods to directly produce glass optical elements suitable for use by molding alone has necessitated continued reliance on the time consuming and expensive grinding and polishing operations described above.

Recently, glasslike carbon materials have been developed which have found many applications in the electronics and metallurgy fields. It has been discovered, as disclosed in commonly assigned U.S. Pat. No. 3,900,328 issued Aug. 19, 1975, that these glasslike carbon materials can be used as a molding surface in a mold cavity for directly producing glass lenses which require no subsequent grinding and polishing operations, wherein a heat-softened glass is placed in the mold cavity and pressed to form a lens having a shape generally determined by the shape of the mold cavity. An improved method of molding glass lenses employing these glasslike carbon materials is disclosed in U.S. Pat. No. 3,833,347, issued Sept. 3, 1974, a continuation of U.S. application Ser. No. 93,351, filed Nov. 27, 1970, wherein the portion of glass to be molded is heated while it is in proximity to or in contact with the glasslike carbon molding surface. Another improved method of molding glass into optical elements employing glasslike carbon molding surfaces is disclosed in U.S. Pat. No. 3,844,755, issued Oct. 29, 1974, wherein optical glass in a glasslike carbon transfer chamber is heat-softened and subjected to pressure, thereby transferring the glass through a sprue and into a mold cavity having molding surfaces of glasslike carbon.

While the use of glasslike carbon represents a significant breakthrough in the art of lens fabrication, glasslike carbon possesses several properties which make it a less than ideal molding-surface material. Glasslike carbon is subject to oxidation, is structurally weak, is subject to surface scratching, has a low modulus of elasticity, has low fracture and impact strength, and has low thermal conductivity. All of these characteristics are undesirable in a glass molding material, and tend to limit the usefulness of glasslike carbon molding surfaces. It would be desirable to find other mold materials possessing the favorable glass molding properties of glasslike carbon, but materials which would at the same time possess improved structural and thermal properties.

SUMMARY OF THE INVENTION

It has now been found that glass elements having high surface quality and high surface accuracy, and therefore requiring no further preparatory operations such as grinding or polishing, can be prepared by molding glass against a molding surface formed from either silicon carbide or silicon nitride. The molding surface can be formed from a solid body of the particular material or from a layer of the material on a substrate. In either case, the material must be of sufficient thickness that the molding characteristics of the molding surface are exclusively attributable to the silicon carbide or silicon nitride; preferably such a layer should be at least 10 microns thick. The use of a silicon carbide or silicon nitride molding surface is particularly necessary to the invention, because it has been found that certain other refractory materials, such as, for example, aluminum oxide or boron nitride, could not be satisfactorily employed as molding surfaces.

In one embodiment of the present invention, the molding process comprises the steps of placing a portion of heat-softened glass in a mold having silicon carbide or silicon nitride molding surfaces such as described above, pressing the glass against the molding surfaces until the glass conforms to the shape of the mold, cooling the glass and mold, and removing the glass element from the mold. In another embodiment of the invention, the molding process comprises the steps of placing a portion of glass in a mold having the above-mentioned silicon carbide or silicon nitride molding surfaces, heating the mold to soften the glass, pressing the glass against the molding surfaces until the glass conforms to the shape of the mold, cooling the glass and mold, and removing the glass element from the mold. In yet a third embodiment of the present invention, the molding process comprises the steps of placing a portion of glass in a transfer chamber having silicon carbide or silicon nitride walls, heating the chamber to soften the glass, applying pressure so that the heat-softened glass is transferred through sprues into mold cavities defined by molding surfaces formed of silicon carbide or silicon nitride until the glass conforms to the shape of the mold cavities, cooling the glass and molding surfaces, and removing the glass element from the mold.

BRIEF DESCRIPTION OF THE DRAWINGS

In the preferred embodiments of the invention described below, reference is made to the accompanying drawings, in which.

DETAILED DESCRIPTION OF THE PREFERRED EMBODIMENTS

The present invention provides a practicable method for molding glass elements having high surface quality and high surface accuracy, such as, for instance, glass lenses possessing good image-forming qualities for use in photographic apparatus. The molding process employs a molding surface having high surface quality and high surface accuracy formed from silicon carbide or silicon nitride. The silicon carbide or silicon nitride in which the molding surface is formed should be of sufficient thickness that the molding characteristics of the molding surface are exclusively attributable to the silicon carbide or silicon nitride, in order to produce a glass element having the desired high surface quality and high surface accuracy. The molding surface can be formed in a solid body of the particular material or from a layer of one of the materials deposited on a suitable substrate by methods to be described below. In the case of a layer deposited on a substrate, it is necessary that the layer be of sufficient thickness so that, even after removal of some of the layer during finishing, the remaining portion of the layer is still sufficiently thick that the surface characteristics of the molding surface are exclusively attributable to the layer, with no interaction between the substrate and the molded glass. Preferably, the layer should be at least 10 microns thick.

The present invention makes use of silicon carbide or silicon nitride as a molding surface material because it has been found that each of these materials possesses properties which make it an excellent material for such use. Like the glasslike carbons of the prior art, each of these materials exhibits minimal chemical activity to glass at high temperatures, is impermeable to gases, water vapor and liquids, and is not permanently adhered to by heat-softened glass. In contrast to glasslike carbon materials, however, each of these materials also possesses the additional favorable characteristics of being more resistant to oxidation, having improved fracture and impact strength at high temperatures, having improved physical hardness (being therefore less subject to scratching), and having higher thermal conductivity (allowing for more rapid thermal cycling).

The silicon carbide or silicon nitride useful in the practice of the invention can be prepared by any of several methods. One method is by hot-pressing to produce a fine-grained silicon carbide or silicon nitride. A second method comprises depositing silicon carbide or silicon nitride, either as a solid body or as a layer on a suitable substrate, by the use of a "sputtering" technique in which ions are ejected from a source body by action of ionic bombardment, and are redeposited to form a molding surface. In a third method, silicon carbide or silicon nitride is prepared by chemical vapor deposition, again either as a solid piece or as a layer on a suitable substrate. Silicon carbide or silicon nitride produced by the second and third methods possess the advantageous properties of lacking internal voids and having the capability of being polished to a continuous, highly specular surface.

Several techniques may be used to produce a molding surface useful in the practice of the invention. If the material is in a solid piece, the piece can be ground and polished to form a molding surface that is comparable to the shape and finish desired in the molded elements. A rough shape could have been pre-formed in the solid piece during its formation, thereby minimizing the grinding operation. A second technique involves generating, grinding, and polishing the mold form directly from a deposit of silicon carbide or silicon nitride. The deposit must be thick enough to provide a sufficient base for support and mounting, allowing for material to be cut away in forming the desired curve. Another technique involves forming a relatively thin deposit of silicon carbide or silicon nitride on a suitable precurved substrate, such as graphite, molybdenum, or hot pressed silicon carbide or silicon nitride. However, the deposit of silicon carbide or silicon nitride must be thick enough so that even after grinding and polishing to the desired specifications, the molding surface characteristics are exclusively attributable to the deposited layer. A fourth technique for forming a suitable molding surface involves the use of an inverse mold form surface as a base for deposit of silicon carbide or silicon nitride. In this technique, a parting or release agent is first applied to the inverse mold form, followed by the deposition of a relatively thick layer of the particular material. The resulting mold surface separates at the parting layer from the inverse mold form and can be used with little or no surface corrections. Again, the layer must be sufficiently thick so that the molding characteristics are exclusively attributable to the deposited layer of material. The silicon carbide or silicon nitride molds so produced are preferably installed as inserts on sturdy support members in order to add strength and durability to the molds.

The method of molding glass elements essentially requires that heat-softened glass be pressed against a silicon carbide or silicon nitride molding surface, produced as described above until the glass conforms to the shape of the molding surface; the glass is then cooled to below its transformation temperature while still being pressed against the molding surface; and then the glass element is removed from the molding surface.

Figure 1:
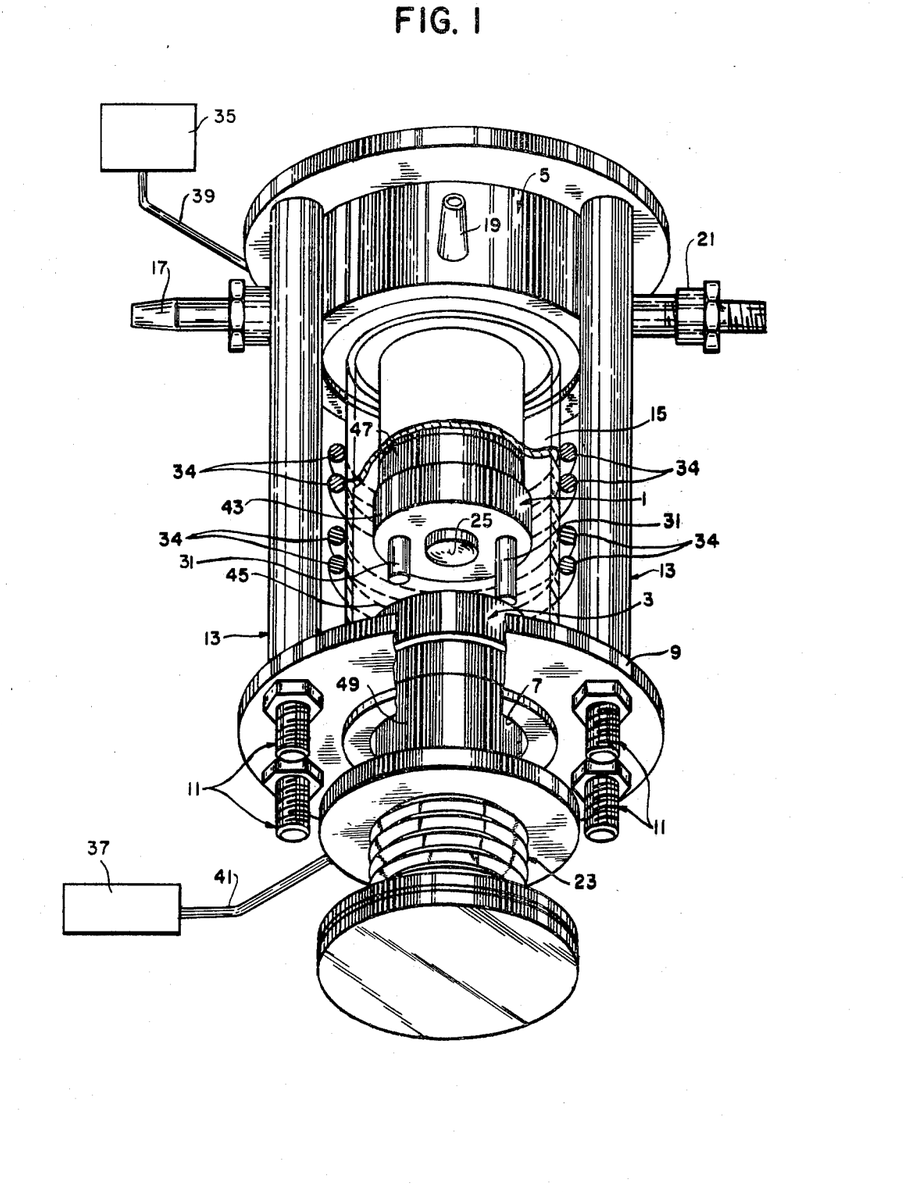
FIG. 1 is a partially cut away perspective view of a molding apparatus for producing glass elements according to the invention.

In one embodiment of the present invention, a method of molding glass elements according to the invention could utilize a molding apparatus such as that shown in FIG. 1, which apparatus is particularly adapted to the molding of glass lenses. The apparatus comprises a stationary upper mold assembly 1 and a lower molding assembly 3. Upper mold assembly 1 is fixed in an upper mount 5 whereas lower mold assembly 3 is vertically movable through a circular aperture 7 provided in a base plate 9. Upper mount 5 and base plate 9 are connected by a set of bolts 11 which extend through a set of tubes 13. A molding chamber is defined by a borosilicate glass (such as Pyrex) envelope 15 which has a cylindrical shape and which encloses the molding space located between the upper and lower mold assemblies. Alternatively, the envelope could be made of metal. A port 17 (which can be closed by a valve which is not shown) is connected to the molding chamber defined by envelope 15 for exhausting gas from the chamber; a second port 19 is similarly connected to the molding chamber for admitting a controlled atmosphere to the molding chamber; and a third port 21 is also connected to the molding chamber and serves as an exhaust for the controlled atmosphere, there being provided a check valve (not shown) for regulating the exhaust to thereby control the pressure of the gas in the molding chamber. A bellows 23 is disposed beneath lower mold assembly 3, and its interior is connected to the molding chamber defined by envelope 15. The purpose of the bellows is to permit movement of lower mold assembly 3 upwardly while maintaining atmosphere control in the molding chamber.

Figures 2, 3A, 3B:
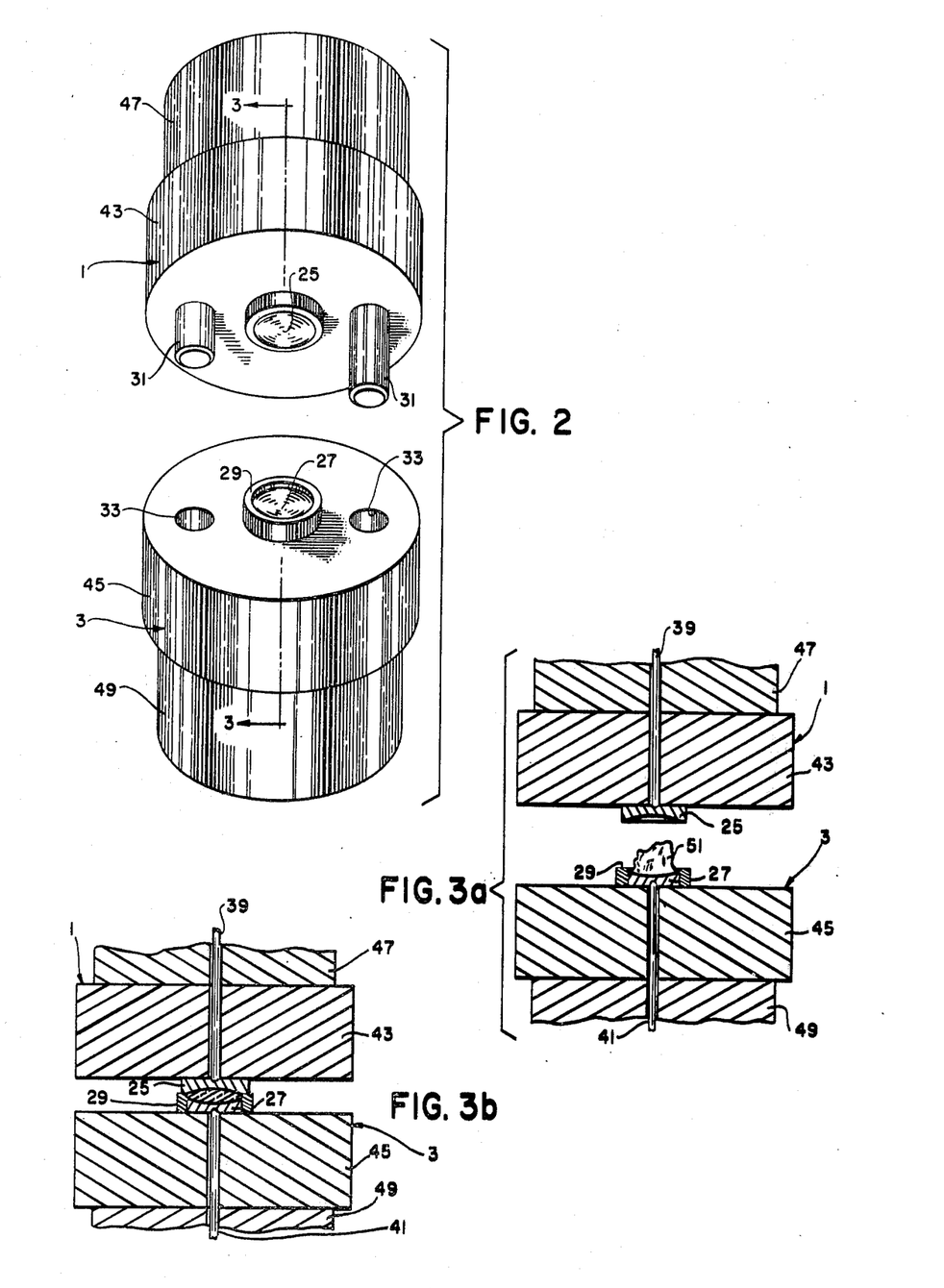
FIG. 2 is a detailed view of a mold employed in the molding apparatus shown in FIG. 1.
FIGS. 3A and 3B are partial cross-sectional views, taken through the line 3—3 in FIG. 2, during different stages of the operation of the molding apparatus of FIG. 1.

Referring specifically to FIG. 2, upper mold assembly 1 has disposed on the lower face thereof a mold member comprising an insert 23 which is formed of silicon carbide or silicon nitride and is configured to provide the proper shape of the part of the lens to be produced thereby. A similar mold member in the form of an insert 27 is disposed opposite to insert 25 and is mounted on the upper face of lower mold assembly 3. The opposing surfaces of the two mold inserts 25 and 27 cooperate to form the opposite faces of the lens to be produced by the mold. A ring 29, which may be though not necessarily is made of the same material as inserts 25 and 27, is disposed around insert 27 for adding the desired thickness to the lens to be reproduced. Ring 29 may be eliminated for open-die molding. The mold forming surfaces are thus made of silicon carbide or silicon nitride, they are finished to have a high surface accuracy and shaped to produce the intended lens, and they are polished to a high quality comparable to that of the intended lens. Lower mold assembly 3 is displaceable towards upper mold assembly 1, and its path is accurately maintained by a pair of guide pins 31 which travel in appropriate inserts 33 extending into lower mold assembly 3. The pins and inserts can advantageously be made of aluminum oxide.

A heating coil 34 is wrapped around envelope 15 so as to surround the molding area. When the coils are activated, ring 29 and inserts 25 and 27, as well as a pair of supports 43 and 45 on which the respective inserts 25 and 27 are mounted, are heated by induction. Heat is transmitted by conduction from supports 43 and 45, which act as heat reservoirs, to inserts 25 and 27. While heating coil 34 is shown outside of envelope 15, this is done for ease of assembly. Coil 34 could be positioned inside envelope 15 and could take any form known in the art that will provide sufficient heat to permit molding of the optical glass in the molding chamber. Supports 43 and 45 may be made of graphite, molybdenum or other similar material.

The mold temperature is controlled by a pair of termocouples 35 and 37, which are connected to inserts 25 and 27 by means of appropriate leads 39 and 41 extending through the two mold assemblies, as shown in FIGS. 3A and 3B. In order to confine the generated heat to the molding vicinity, a pair of pyrolytic graphite insulators 47 and 49 are disposed on the ends of supports 43 and 45, opposite the inserts 25 and 27. The pyrolytic graphite conducts heat in the horizontal direction (with reference to the drawings) and is less conductive in the vertical direction. Lower mold assembly 3 can be displaced by pneumatic, hydraulic, mechanical or any other appropriate means (not shown) for producing the desired movement.

The method of molding glass lenses to be described below requires a mold having molding surfaces which are configured and finished to yield lenses having prescribed shapes and high surface qualities. It is to be understood, therefore, that inserts 25 and 27 are dimensioned and polished to the accuracy and quality of the lenses to be manufactured. While the silicon carbide or silicon nitride molds have preferably been illustrated as inserts on relatively sturdy support members, the support members are present for heat transfer and to add strength and durability to the molding apparatus. Molding of glass elements such as optical lenses can also be achieved in a molding apparatus which does not include supports.

It has been found that glass elements molded against molding surfaces having high surface quality and high surface accuracy formed from silicon carbide or silicon nitride of sufficient thickness as described hereinbefore will also possess high surface quality and high surface accuracy. A suitable molding surface can be prepared by grinding and polishing a silicon carbide or silicon nitride layer or a solid silicon carbide or silicon nitride body until it meets the surface tolerance limits established for the final glass element. As indicated previously, the "high surface accruacy" required of lenses of the quality used in photographic apparatus should be within six Newton rings of power and three rings of irregularity. Surface accuracy well within these tolerances has been achieved in the walls defining the cavities of the silicon carbide or silicon nitride molds. Likewise, these same mold walls must have "high surface quality" as is required of the finished lenses, which renders the walls substantially devoid of scratches, digs, pits and the like, and such surface quality has also been at least partially achieved in the practice of this invention. During these grinding and polishing operations, the mold cavities may also be configured to yield a glass element of a predetermined shape with a molded mounting shoulder and the ridges and grooves associated with mounting seats. The walls defining the cavities are shaped much like the predetermined shape of the lens and lens shoulder to be produced by the mold, but provisions may have to be made for dimensional changes and the like during and after the molding process. Thus, the molded element will be ready for final assembly without subsequent grinding and polishing.

According to a preferred method of molding optical elements by this invention, a quantity of glass is placed within the molding chamber. It may be set in contact with insert 27, as shown in FIG. 3A or provision may be made to hold the glass out of contact with inserts 25 and 27 until heated. The glass must be shaped to fit within the molding chamber but need not be preformed to a different volume and shape for different lens designs, although preforming is preferable. Preferably, the surface of the glass slug is fire or machine polished to a high quality but this may not be necessary in all cases. The mechanical means are then actuated to move lower mold assembly 3 upwardly to bring the glass, ring 29 and insert 27 into the molding chamber and into proximity with insert 25. Bellows 23 will be compressed while maintaining a vacuum seal. The atmosphere within the molding chamber may now be evacuated through port 17. Simultaneously, heat is introduced into the molding chamber by means of coils 34 to outgas the molding chamber, the surfaces of ring 29 and inserts 25 and 27 and the glass. The desired controlled atmosphere, preferably nitrogen, may now be introduced into the molding chamber through port 19, with pressure control by port 21. Heating coils 34 are again actuated causing continued heating of supports 43 and 45, ring 29, inserts 25 and 27 and the glass in the molding chamber until the desired molding temperature is reached. The temperature of inserts 25 and 27 may be monitored by thermocouples as shown, by optical pyrometry equipment or by other suitable means. When the desired temperature has been attained and stabilized, the glass, ring 29 and inserts 25 and 27 will be at substantially although not necessarily exactly the same temperature. A load is now applied to lower mold assembly 3, bringing ring 29 into contact with insert 25 and forming a molding cavity with inserts 25 and 27 and ring 29. After a suitable molding time, the temperature of the mold will be reduced gradually to bring the temperature below the glass transformation point while still maintaining a load on the glass, to minimize distortion of glass as the temperature is reduced. After the glass transformation temperature has been reached, the load may be removed from lower mold assembly 3.

A specific example of the practice of the invention using an apparatus as described above is as follows:

with lower mold assembly 3 in its downward position, a portion of extra dense flint optical glass is placed on insert 27, after which the mechanical means are actuated to move lower mold assembly 3 in an upwardly direction so as to enter the molding chamber and to move into proximity with upper mold assembly 1;

the molding chamber is now evacuated by means of port 17 to approximately 200 microns and simultaneously, the surfaces of the glass, ring 29 and inserts 25 and 27 are outgassed at a temperature between about 400° F. and 570° F. by means of heating coils 34;

port 17 is now closed and a controlled atmosphere of nitrogen gas is introduced into the molding chamber through port 19, with a slight over pressure maintained by means of port 21;

power to coils 34 is adjusted to raise the temperature within the molding chamber until the glass is softened sufficiently to mold and the temperature is maintained for a period of about 1.5 minutes, a temperature of about 1050° F. for extra dense flint optical glass is sufficient, but the necessary temperature will vary depending on the nature of the glass being molded;

a load is now applied to lower mold assembly 3, thereby pressing the heat-softened glass within the molding chamber between ring 29 and inserts 25 and 27 as shown in FIG. 3B, the load applied being approximately 130 pounds per square inch and applied for about 10 seconds with a higher load requiring a shorter loading time;

heating of the mold members is now terminated while a load is maintained on lower mold assembly 3 until a temperature below the transformation temperature of the glass being molded is reached;

the load on lower mold assembly 3 can now be removed and the temperature in the mold chamber reduced further to about 400° F., thereby minimizing the possibility of oxidation of ring 29, inserts 25 and 27 and supports 43 and 45; and the mold may now be opened by downward movement of lower mold assembly 3 and the resulting molded glass element may be removed from insert 27.

In another embodiment of the present invention adapted to the production of glass lenses, a molding apparatus is employed which utilizes silicon carbide or silicon nitride molding surfaces as previously described, but which is otherwise similar to the apparatus disclosed in U.S. Pat. No. 3,900,328 issued Aug. 19, 1975, wherein at column 6, lines 14 to 63 there is described molding apparatus comprising a stationary mold assembly and an opposed movable mold assembly which is driven in a reciprocating manner by a conventional pneumatic press or other device. The two mold assemblies are contained in a glass envelope which defines a molding chamber in which atmospheric conditions can be controlled. The mold assemblies include mold inserts, graphite cores for supporting the inserts in an opposed relationship, supports which can be comprised of graphite, sets of ceramic encased heaters for supplying (by conduction) the heat required for the molding operation, and thermocouple assemblies which are thermally connected with the mold inserts for controlling the molding temperatures.

In order to effectively practice the disclosed embodiment of the invention, it is necessary to maintain an oxygen free atmosphere within the molding chamber. Therefore, input ports for forming gas to be admitted to the chamber are provided. An entrance is provided in the glass envelope (containing the mold assemblies) for admitting glass stock to the molding area and a gas jet surrounds the entrance for releasing oxygen-starved gas which is ignited to form a flame curtain to prevent the passage of oxygen into the chamber. Using this apparatus, the method comprises placing a portion of glass which has been heat-softened outside of the mold cavity into a mold cavity defined by silicon carbide or silicon nitride molding surfaces; compressing the glass until the glass conforms to the shape of the mold cavity; cooling the glass and mold; and removing the glass lens, which is suitable for use without further preparatory operations.

In a third embodiment of the invention, a molding apparatus is employed which utilizes the silicon carbide or silicon nitride molding surfaces above-described, but which is otherwise similar to the apparatus disclosed in U.S. Pat. No. 3,844,755, issued Oct. 29, 1974 wherein at column 4, line 48 to column 6, line 58 there is described apparatus comprising a molding chamber defined by a wall generally cylindrical in shape and fixedly supported between upper and lower mounting plates. The wall may be made of a transparent material such as plastic or glass, or alternatively could be made of metal. Access is provided to the interior of the molding chamber by means of a vacuum line through which the atmosphere in the chamber may be exhausted, a gas line through which a controlled atmosphere may be introduced into the chamber and an exhaust line to provide an exit means for the controlled atmosphere. A heating coil is mounted outside of the chamber so as to surround the molding area and to provide heat to upper and lower mold assemblies which include mold inserts disposed on a graphite base.

The molding chamber may be sealed by the use of sealing plates, sealing ring and bellows so as to provide a vacuum seal around the molds. The press assembly consists of chamber pistons and a molding press, each of which may consist of conventional pneumatic pistons such as known in the art or other hydraulic, mechanical or appropriate means for producing the desired movement.

An example of using this molding apparatus as described in U.S. Pat. No. 3,844,755 would be the molding of a glass lens by a series of steps comprising: placing an unheated portion of glass in a transfer chamber defined by silicon carbide or silicon nitride molding surfaces; heating the mold members, transfer chamber and glass to soften the glass; forcing the heated glass from the transfer chamber through sprues into mold cavities defined by silicon carbide or silicon nitride until the glass conforms to the shape of the mold cavity; cooling the glass and mold members; and removing the glass lens from the mold.

The invention has been described in detail with particular reference to preferred embodiments thereof but it will be understood that variations and modifications can be effected within the spirit and scope of the invention. In particular, it should be noted that the apparatus shown is only exemplary of molding apparatus for operation of the present invention and other types of molding apparatus in which different elements may be moved to define a mold cavity may be utilized for practice of this invention. Moreover, the specific example of a molding method is also only exemplary of many molding methods which can be utilized for the practice of this invention, with selection of the molding parameters, such as cycle times, loads and temperatures, being dependent upon many factors, including but not limited to the type of glass being molded as well as the prescribed design of the element which is to be molded. Finally, it should be possible to select molding parameters which would permit the molding of plastics into finished optical elements.

We claim:

1. A method of molding a finished optical surface having high surface quality and accuracy on vitreous material in an non-oxidizing atmosphere which comprises pressing heat-softened vitreous material against a specular molding surface formed from a material selected from the group consisting of silicon carbide and silicon nitride with sufficient force to conform the vitreous material to the molding surface.

2. A method as in claim 1 wherein the selected material is silicon carbide.

3. A method of molding a finished optical surface on glass in a non-oxidizing atmosphere which comprises pressing heat-softened glass against a molding surface formed from a material selected from the group consisting of silicon carbide and silicon nitride with sufficient force to conform the glass to the molding surface, the selected material being of sufficient thickness that the molding characteristics of the molding surface are exclusively attributable to the selected material and the selected material having been finished to provide a molding surface which is specular and which has a high surface quality and a high surface accuracy.

4. A method of molding a finished optical surface on glass in a non-oxidizing atmosphere comprising the steps of:
providing a surface formed from a material consisting essentially of silicon carbide, the surface having been finished to provide a molding surface which has a high surface quality and a high surface accuracy; and
pressing a heat-softened glass against the molding surface with sufficient force to conform the glass to the molding surface.

5. A method of molding a finished optical surface having high surface quality and accuracy on glass in a non-oxidizing atmosphere comprising the steps of:
providing a molding surface formed from a material selected from the group consisting of silicon carbide and silicon nitride, the selected material being of sufficient thickness that the molding characteristics of the molding surface are exclusively attributable to the selected material;
heating the glass and molding surface;
pressing the glass against the molding surface with sufficient force that the glass conforms to the configuration of the molding surface;
cooling the glass and molding surface; and
removing the molded glass.

6. A method of molding a finished optical surface on glass in a non-oxidizing atmosphere comprising the steps of:
providing a surface formed from a material consisting essentially of silicon carbide, the surface having been finished to be specular and to have a high surface quality and a high surface accuracy and the selected material being of sufficient thickness such that the molding characteristics of the molding surface are exclusively attributable to the selected material;
heating the glass and molding surface;
pressing the glass against the molding surface with sufficient force that the glass conforms to the configuration of the molding surface;
cooling the glass and molding surface; and
removing the molded glass.

7. A method of molding glass in a non-oxidizing atmosphere comprising the steps of:
providing a mold having a plurality of mold members relatively movable between an open and a closed position, the mold members including surfaces formed from a material selected from the group consisting of silicon carbide and silicon nitride, the surfaces having been finished to provide molding surfaces and the selected material being of sufficient thickness that the molding characteristics of the molding surfaces are exclusively attributable to the selected material, with the molding surfaces defining a mold cavity when the mold members are in the closed position;
urging the mold members toward the closed position;
pressing a heat-softened glass against the molding surfaces with sufficient force to form the glass into the configuration of the mold cavity;
cooling the glass and mold members to a temperature below the transformation temperature of the glass; and
moving the mold members to the open position to permit removal of the molded glass from the mold.

8. A method as in claim 7, wherein the selected material is silicon carbide.

9. A method of molding a finished optical surface on glass in a non-oxidizing atmosphere comprising the steps of:
providing a mold having a plurality of mold members relatively movable between an open position and a closed position, the mold members including surfaces formed from a material selected from the group consisting of silicon carbide and silicon nitride, the surfaces having been finished to provide molding surfaces which are specular and which have a high surface quality and high surface accuracy;
moving the mold members toward the closed positions;
pressing a heat-softened glass against the molding surfaces with sufficient force to form the glass into the configuration of the mold cavity;
cooling the glass and mold members to a temperature below the transformation temperature of the glass; and
moving the mold members to the open position to permit removal of the molded glass from the mold.

10. A method as in claim 9 wherein the selected material is silicon carbide.

11. A method of molding a finished optical surface having high surface quality and accuracy on glass comprising the steps of:
providing a mold having a plurality of mold members relatively movable between open and closed positions, the mold members including surfaces formed of a material consisting essentially of silicon carbide or silicon nitride, the surfaces having been finished to provide molding surfaces that define a mold cavity when the mold members are in the closed position;
establishing a controlled non-oxidizing atmosphere around the mold members and glass;
heating the glass and mold members;
urging the mold members toward the closed position;
pressing the heat-softened glass against the molding surfaces with sufficient force to form the glass into the configuration of the mold cavity;
cooling the glass and mold members to a temperature below the transformation temperature of the glass;
moving the mold members to the open position to permit removal of the molded glass.

12. A method of molding a finished optical surface on glass in a non-oxidizing atmosphere which comprises pressing a heat-softened glass against a molding surface formed from silicon carbide, the silicon carbide being of sufficient thickness that the molding characteristics of the molding surface are directly attributable to the silicon carbide.

13. A method of molding glass in a non-oxidizing atmosphere which comprises pressing a heat-softened glass against a molding surface formed of silicon carbide.

14. A method of molding a finished optical surface having high surface quality and accuracy on glass in a non-oxidizing atmosphere comprising the steps of:
providing a mold having a plurality of mold members relatively movable between open and closed positions, the mold members including surfaces formed from silicon carbide, the silicon carbide surfaces having been finished to provide molding surfaces and the silicon carbide being of sufficient thickness that the molding characteristics of the molding surfaces are directly attributable to the silicon carbide, with the molding surfaces defining a mold cavity when the mold members are in the closed positions;
pressing a heat-softened glass against the silicon carbide molding surfaces with sufficient force to form the glass into the configuration of the mold cavity;
cooling the glass and mold members to a temperature below the transformation temperature of the glass; and
moving the mold members to the open position to permit removal of the molded glass.

15. A method of molding a finished optical surface having high surface quality and accuracy on glass in a non-oxidizing atmosphere comprising the steps of:
providing a molding surface formed from silicon carbide of sufficient thickness that the molding characteristics of the molding surface are exclusively attributable to the silicon carbide;
heating the glass and molding surface;
pressing the heat-softened glass against the molding surface with sufficient force that the glass conforms to the configuration of the molding surface;
cooling the glass and molding surface; and
removing the molded glass.

16. A method of molding a finished optical surface on a glass element in a non-oxidizing atmosphere comprising the steps of:
providing a mold having a plurality of mold members relatively movable between open and closed positions, the mold members including surfaces formed from silicon carbide, the silicon carbide surfaces having been finished to provide molding surfaces that define mold cavities when the mold members are in the closed position and the silicon carbide being of sufficient thickness that the molding characteristics of the molding surfaces are exclusively attributable to the silicon carbide;
heating the glass and mold members;
urging the mold members toward the closed position;
pressing the heat-softened glass against the silicon carbide molding surfaces with sufficient force to form the glass into the configuration of the mold cavity;
cooling the glass and mold members to a temperature below the transformation temperature of the glass;
moving the mold members to the open position to permit removal of the molded glass.

17. A method of molding finished glass elements comprising the steps of:
providing a mold having a plurality of mold members relatively movable between open and closed positions, the mold members including surfaces formed of silicon carbide, the silicon carbide surfaces having been finished to provide molding surfaces that are specular and that have a high surface quality and a high surface accuracy, the silicon carbide being of sufficient thickness that the molding characteristics of the molding surfaces are exclusively attributable to the silicon carbide;
establishing a controlled non-oxidizing atmosphere around the glass and mold members;
heating the glass and mold members;
urging the mold members toward the closed positions;
pressing the heat-softened glass against the silicon carbide molding surfaces with sufficient force to form the glass into the configuration of the mold cavity;

cooling the glass and mold members to a temperature below the transformation temperature of the glass;

moving the mold members to the open position to permit removal of the molded glass.

18. A glass element having a finished optical surface of high surface quality and accuracy prepared by a method of molding in a non-oxidizing atmosphere comprising the steps of:

pressing a heat-softened glass against a molding surface formed from a material selected from the group consisting of silicon carbide and silicon nitride, the selected material being of sufficient thickness that the molding characteristics of the molding surface are exclusively attributable to the selected material;

cooling the glass and molding surface; and removing the molded glass.

19. A glass element prepared as in claim 18 wherein the selected material is silicon carbide.

20. A glass element having high surface quality and high surface accuracy prepared by a method of molding in a non-oxidizing atmosphere comprising the steps of:

pressing a heat-softened glass against a molding surface formed of a material selected from the group consisting of silicon carbide and silicon nitride;

cooling the glass and molding surface; and removing the molded glass.

21. A glass element prepared as in claim 20 wherein the selected material is silicon carbide.

22. A method of molding a finished optical surface having high surface quality and accuracy on glass in a non-oxidizing atmosphere comprising the steps of:

forming a molding surface from a material consisting essentially of silicon carbide or silicon nitride, the selected material being of sufficient thickness that the molding characteristics of the molding surface are exclusively attributable to the selected material; and pressing a heat-softened glass against the molding surface with sufficient force to shape the glass to the configuration of the molding surface.

23. A method of molding a finished optical surface on glass comprising the steps of:

forming a mold with a plurality of mold members relatively movable between open and closed positions, the mold members including surfaces consisting essentially of silicon carbide, the surfaces having been finished to provide molding surfaces which are specular and which have a high surface quality and a high surface accuracy, the silicon carbide being of sufficient thickness that the molding characteristics of the molding surfaces are directly attributable to the silicon carbide and the molding surfaces defining a mold cavity when the mold members are in the closed positions;

establishing a controlled non-oxidizing atmosphere around the glass and mold members;

heating the glass and mold members;

urging the mold members toward the closed positions;

pressing the heat-softened glass against the molding surfaces with sufficient force to form the glass into the configuration of the mold cavity;

cooling the glass and mold members to a temperature below the transformation temperature of the glass; and moving the mold members to the open position to permit removal of the molded glass.

24. A method as in claim 23 wherein the selected material is at least 10 microns thick.

* * * * *